Aug. 10, 1965  W. W. PULTZ  3,199,954
METHOD OF MANUFACTURING FIBERS CONTAINING SILICON CRYSTALS
Filed May 31, 1962
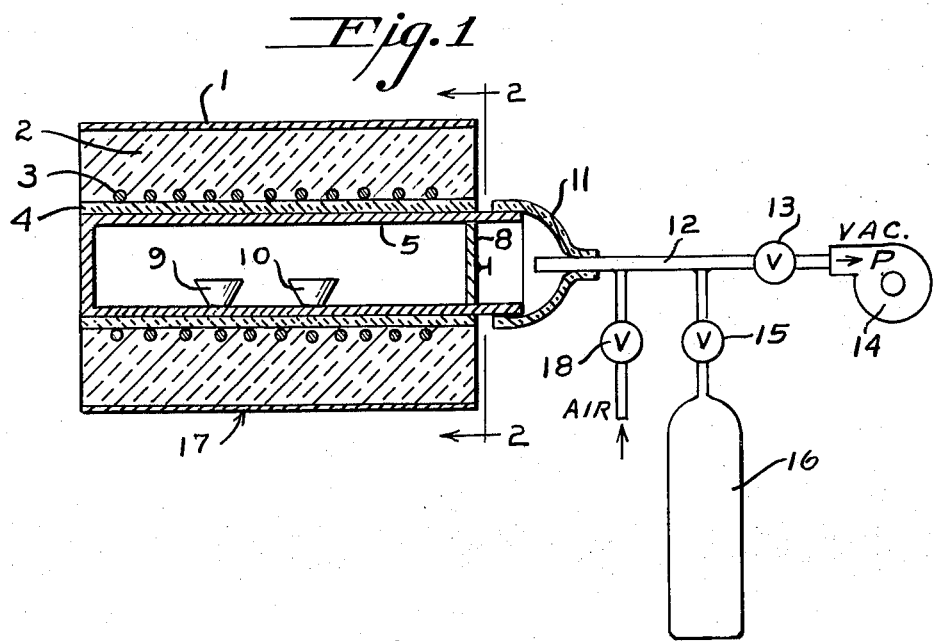
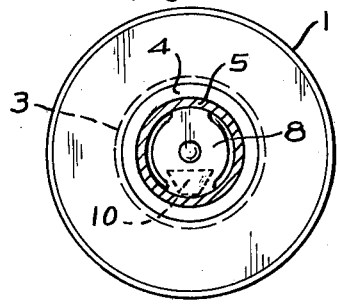
INVENTOR.
WALLACE W. PULTZ
BY
ATTORNEY

United States Patent Office 3,199,954
Patented Aug. 10, 1965

3,199,954
METHOD OF MANUFACTURING FIBERS CONTAINING SILICON CRYSTALS
Wallace W. Pultz, Corning, N.Y., assignor to Corning Glass Works, Corning, N.Y., a corporation of New York
Filed May 31, 1962, Ser. No. 198,829
10 Claims. (Cl. 23—223.5)

This invention relates to the manufacture of inorganic fibers which exhibit high strength and chemical inertness at elevated temperatures. More particularly, this invention relates to the manufacture of fibers containing silicon crystals.

Fibers of glass have been known for many years. Yet it is only comparatively recently that the great potentiality of this material has been more fully appreciated and exploited. The last World War opened up vast new markets for products of glass fibers, particularly in the fields of acoustic, electrical, and thermal insulations, and the tremendous demands of the armed forces contributed substantially to the expansion of this industry. However, with the advent of the age of atomic energy, jet aircraft, space missiles, and the revolutionary trend in military weapons, has come the demand for extremely high temperature insulations and, in many instances, for good resistance to chemical corrosion.

Glass fibers have also seen service as reinforcing elements in plastics, rubber, glasses, and even in metals. Nevertheless, here again, the common glass fibers have not proven entirely satisfactory, particularly with regard to resistance to chemical attack and the loss of strength experienced in high temperature applications.

There has thus been a real need for fibers capable of withstanding high temperatures and chemical corrosion and of exhibiting high strength even at elevated temperatures.

It is a well-recognized fact that silicon metal is extremely inert toward many chemical reagents and it has been appreciated that, if fibers containing silicon crystals could be produced, they would possess the desired strength, chemical inertness, and resistance to high temperatures. Nevertheless, the prior workers in this field have not been able to produce such fibers in satisfactory quantities or sizes. In most instances, attempts to manufacture fibers of silicon have resulted only in extremely fine, particulate material and, if any fibers were developed, they were but of microscopic, or even submicroscopic, size, perhaps a few microns in length and a fraction of a micron in diameter. This size rendered them of limited practical significance.

It is, therefore, the principal object of my invention to provide a method of manufacturing fibers containing silicon crystals which are of such size as to be eminently useful in insulation applications and as reinforcing elements in plastics, rubber, glasses, and metals.

Another object of my invention is to provide a method of manufacturing fibers containing silicon crystals whereby the size of the fibers and the quantities thereof can be carefully controlled.

A further object of my invention is to provide a method of manufacturing fibers containing silicon crystals of such quality as to be extremely resistant to chemical attack.

Still another object of my invention is to provide a method of manufacturing fibers containing silicon crystals which is relatively simple and economical in operation, which can be practiced with apparatus known to the art, and which employs commercially available batch ingredients.

FIG. 1 is a diagrammatic arrangement of apparatus suitable for producing fibers containing silicon crystals according to the present invention.

FIG. 2 is a vertical sectional view along the lines 2—2 of FIG. 1.

I have discovered that a fibrous material containing silicon crystals in lengths up to 20 mm. and longer, with diameters of several microns, can be produced through the reaction of gaseous boric oxide with gaseous silicon monoxide. The fibers show remarkable uniformity in diameter throughout their length, thus making them particularly suitable as reinforcing elements. The exceptional resistance to chemical corrosion of these fibers is attested to not only by their general inertness to the common acids and alkalies, but also by their only slight solubility in concentrated hydrofluoric acid, thus placing them in an area completely beyond the glass fibers of commerce. Further, these fibers also exhibit very good resistance to the action of water vapor or steam, an admitted shortcoming of glass fibers.

My invention, then, is based upon the production of silicon-containing fibers through the reaction of gaseous boric oxide with gaseous silicon monoxide. In the preferred embodiment of my invention, the $B_2O_3$ gas is vaporized from molten boric oxide in a temperature range of about 1000°–1200° C. and the SiO vapor is produced by the reaction of powdered silicon metal with a silica source (normally sand) in a temperature range of about 1200° C. to 1350° C. Care is exercised to eliminate contaminating gases such as oxygen and water vapor by continuously evacuating the reaction chamber to an absolute pressure of not more than about 100 microns Hg until a temperature of about 1125°–1175° C. is reached. In this range the SiO pressure is substantially nil. A small partial pressure, say about 10–60 mm. Hg, of a non-oxidizing gas such as helium or hydrogen or mixtures thereof, is then introduced into the evacuated reaction chamber to promote fiber growth. Using a partial pressure of such gases greater than about 60 mm. Hg acts to decrease the rate of evaporation of $B_2O_3$ gas, thereby minimizing the formation of fiber growth, and leads to the formation of amorphous boron films on the molten $B_2O_3$ which, in turn, is covered with a silica film. The same film effect is accomplished by increasing the SiO vapor pressure by means of higher $Si-SiO_2$ reaction temperatures, i.e., about 1375° C. or higher. Therefore, it will be appreciated that the partial pressures of SiO and $B_2O_3$ must be carefully balanced to produce the desired fibers. This balance can be maintained through atmosphere gases and/or temperature. The temperatures are held within the respective ranges until the desired formation of fibers is attained, usually about 4–24 hours, after which the fibers are allowed to cool to room temperature.

The fiber growth occurs around the $B_2O_3$ source as a mass of light yellow to dark purple-brown hairs, rather uniform in size, and aligned parallel to an axis running between the sources of SiO and $B_2O_3$. The individual fibers average between 5 and 20 mm. in length and electromicrographs have shown them to have a diameter of about 3 microns. The fibers are quite flexible in that they can be bent to form a circle without fracture and are relatively insoluble in the common acids and alkalies and are but slightly soluble in 48% hydrofluoric acid.

The area of growth of the fibers indicates a diffusion of the SiO vapor to a lower temperature region where it reaches its condensation temperature and reaction concomitantly occurs with the $B_2O_3$. This fiber growth is found in the temperature area where disproportionation of SiO normally occurs.

In the following example, which is given by way of illustration and not of limitation, a refractory tube wound with platinum wire in such manner that a temperature gradient was set up along the length of the tube formed the furnace or reaction chamber. A refractory container or "boat" containing an equimolar mixture of sand and powdered silicon was placed therein and run into the furnace to a point previously determined to be about 1300° C. A second boat was filled with powdered $B_2O_3$ and placed in the furnace at a position wherein the temperature was about 1100° C. The furnace was then heated up, a vacuum being applied to evacuate the furnace tube of contaminating vapors to an absolute pressure of about 50 microns Hg until a temperature of about 1150° C. was reached in the area of the refractory boat containing the $Si$-$SiO_2$ mixture. Helium was then introduced into the evacuated furnace tube to a pressure of about 15 mm. Hg and the temperature raised until the $Si$-$SiO_2$ containing boat was at 1300° C. and the $B_2O_3$-containing boat at 1100° C. The temperatures were held thereat for 10 hours after which the boats were removed from the furnace and examined. A canopy of light yellow to purple-brown hairs was observed over the $B_2O_3$ source boat. These hairs were aligned parallel to the axis of the furnace tube and up to 20 mm. in length. X-ray diffraction patterns indicated crystalline silicon which is in agreement with acid solubility tests. The fibers were but slightly soluble in 48% hydrofluoric acid.

An apparatus for this example is illustrated in the accompanying drawing. A gradient furnace, shown generally in side elevation in cross section, at 17, consists essentially of an alumina or sillimanite refractory tube 4 wound with platinum or platinum-rhodium alloy wire 3 surrounded with insulation, 2, which in turn is held in place by a steel casing 1. The windings of the wire are so spaced as to permit a temperature gradient to exist along the refractory tube. A closed end inner or working liner 5, consisting of a sillimanite refractory tube, is used to protect the wire-wound tube from injury and corrosion during the operation of the furnace and thus, at the same time, preventing contact of the reaction products and starting materials with the wire, thereby causing a furnace failure. The working liner 5 extends beyond the front of the furnace 17 and is there connected to a pipe, 12 through a glass joint connection 11. Pipe 12 leads to a vacuum pump 14 through valve 13 or to a source of air, 19 (not known) through valve 18 or the desired gaseous atmosphere may be introduced into pipe 12 through valve 15 from a lecture bottle 16. A fairly close-fitting platinum disc 8 acts as a radiation shield to limit the escape of heat from the furnace but yet allows a vacuum to be drawn and a gaseous atmosphere to be introduced into the furnace. Alumina refractory boats 9 and 10 are placed within the working liner 5 at certain points where the temperature has been predetermined to be 1300° C. and 1100° C., respectively. Boat 9 contains a mixture of silicon and sand and boat 10 contains a deposit of boric oxide.

In the operation of the apparatus, boats 9 and 10 are filled with their respective charges and inserted into the working liner 5 at the proper positions. The radiation shield 8 is placed into position. Pipe 12 is connected to the working liner 5 through the glass joint connection 11. The furnace was then heated up until a temperature of about 1150° C. was reached in the area of boat 9, a vacuum being applied to evacuate the furnace chamber to an absolute pressure of about 50 microns Hg. Valve 13 was then closed and valve 15 opened and helium gas from lecture bottle 16 passed over the refractory boats at a pressure of about 15 mm. The temperature within the working liner 5 was then raised to 1300° C. in the area of boat, 9, and to 1100° C. in the area of boat 10 and maintained thereat for 10 hours. After 10 hours of reaction time, the furnace was cooled, brought to atmospheric pressure with air introduced through valve 18 and the boats removed from the furnace and examined.

It will be understood that modifications in the design of the reaction chamber and in the production of the reacting gases may be made without departing from the scope of my invention. Only one feature must be adhered to—an opportunity must be presented for gaseous SiO to react with gaseous $B_2O_3$ within the required temperature range. Thus, in the preferred embodiment of my invention, the configuration of the reaction chamber is not of critical importance so long as the charges of $Si$-$SiO_2$ and $B_2O_3$-containing material are placed in such close relation that diffusion of SiO to the $B_2O_3$ source is feasible. Likewise, although my preferred manner of producing gaseous SiO contemplates the heating of a mixture of silicon and silica, it will be understood that other means of providing gaseous SiO are adaptable to my invention. One such means is described in the equation:

$$SiO_2 + H_2 \rightarrow SiO + H_2O$$

This method eliminates the need for elemental silicon and the hydrogen introduced can serve a two-fold purpose. It produces the gaseous SiO and promotes the reaction of the gaseous SiO with the gaseous $B_2O_3$. However, the reaction of hydrogen with silica yields unwanted water vapor which must be removed. Also, the quantity of fibers containing silicon crystals has not been as great as with the preferred method. Further, the source of $B_2O_3$ need not be in the oxide, itself, but may be a compound, which upon heating, will be converted to the oxide. Boric acid is one such compound. Likewise, it will be appreciated that in the above example the tube of the reaction chamber may be heated to the proper temperature, evacuated to eliminate any contaminating vapors, the boats containing the $Si$-$SiO_2$ and $B_2O_3$ source then inserted, the inert gas introduced to promote formation of the silicon-containing fibers, and the temperature held thereat until the desired fiber formation is attained.

Experimentation has shown that the size and quantity of the fibers produced can be quite critically controlled through regulating the time and temperature of the reaction and the partial pressure of the non-oxidizing gas introduced into the reaction chamber. However, the selection of these parameters can be readily determined by one skilled in the art within the framework of the rules set forth hereinabove.

What is claimed is:

1. A method of manufacturing fibers containing silicon crystals comprising the steps of producing SiO vapor and $B_2O_3$ vapor in a reaction chamber, evacuating said reaction chamber to an absolute pressure of not more than about 100 microns Hg, thereafter bringing said SiO vapor into contact with said $B_2O_3$ vapor at about 1000°–1200° C. by introducing a non-oxidizing gas at 10–60 mm. Hg, and maintaining said contact for a time sufficient to cause the formation of fibers through a reaction between the vapors of SiO and $B_2O_3$, this reaction taking place in the temperature area where disproportionation of SiO normally occurs.

2. A method of manufacturing fibers containing silicon crystals comprising the steps of providing a charge of a mixture of Si and $SiO_2$ in close relation to a charge of $B_2O_3$-containing material in a reaction chamber having a temperature gradient therein, simultaneously producing SiO vapor by the reaction of Si with the $SiO_2$ and $B_2O_3$ vapor by heating said charges to 1200°–1350° C. and 1000°–1200° C., respectively, said reaction chamber being evacuated to an absolute pressure of not more than about 100 microns Hg, thereafter bringing said SiO vapor into contact with said $B_2O_3$ vapor by introducing a non-oxidizing gas at 10–60 mm. Hg, and maintaining said contact for a time sufficient to cause the formation of fibers around the charge of $B_2O_3$-containing material as a mass of light yellow to dark purple-brown hairs through a reaction between the vapors of SiO and $B_2O_3$, this reaction taking place in the temperature area where disproportionation of SiO normally occurs.

3. A method of manufacturing fibers containing silicon crystals comprising the steps of providing a charge of a mixture of Si and $SiO_2$ in close relation to a charge of $B_2O_3$-containing material in a reaction chamber having a temperature gradient therein, simultaneously producing SiO vapor by the reaction of Si with the SiO₂ and B₂O₃ vapor by heating said charges to 1200°–1350° C. and 1000°–1200° C., respectively, said reaction chamber being evacuated to an aboslute pressure of not more than about 100 microns Hg until the temperature of the Si-SiO₂ mixture reaches about 1125°–1175° C., thereafter bringing said SiO vapor into contact with said B₂O₃ vapor by introducing a non-oxidizing gas at 10–60 mm. Hg, and maintaining said contact for a time sufficient to cause the formation of fibers around the charge of B₂O₃-containing material as a mass of light yellow to dark purple-brown hairs through a reaction between the vapors of SiO and B₂O₃, this reaction taking place in the temperature area where disproportionation of SiO normally occurs.

4. A method of manufacturing fibers containing silicon crystals in accordance with claim 1, wherein the time sufficient to cause the formation of fibers is about 4–24 hours.

5. A method of manufacturing fibers containing silicon crystals in accordance with claim 1, wherein the non-oxidizing gas is a gas selected from the group consisting of helium, hydrogen, and mixtures thereof.

6. A method of manufacturing fibers containing silicon crystals comprising the steps of providing a charge of an equi-molar mixture of Si and SiO₂ in close relation to a charge of B₂O₃ in a reaction chamber having a temperature gradient therein, simultaneously producing SiO vapor by the reaction of Si with the SiO₂ and B₂O₃ vapor by heating said charges to 1300° C. and 1100° C., respectively, said reaction chamber being evacuated to an absolute pressure of about 50 microns Hg until the temperature of the Si-SiO₂ mixture reaches 1150° C., thereafter bringing said SiO vapor into contact with said B₂O₃ vapor by introducing helium gas at 15 mm. Hg, and maintaining said contact for 10 hours to cause the formation of fibers around the charge of B₂O₃-containing material as a mass of light yellow to dark purple-brown hairs through a reaction between the vapors of SiO and B₂O₃, this reaction taking place in the temperature area where disproportionation of SiO normally occurs.

7. A method of manufacturing fibers containing silicon crystals in accordance with claim 2, wherein the time sufficient to cause the formation of fibers is about 4–24 hours.

8. A method of manufacturing fibers containing silicon crystals in accordance with claim 3, wherein the time sufficient to cause the formation of fibers is about 4–24 hours.

9. A method of manufacturing fibers containing silicon crystals in accordance with claim 2, wherein the non-oxidizing gas is a gas selected from the group consisting of helium, hydrogen, and mixtures thereof.

10. A method of manufacturing fibers containing silicon crystals in accordance with claim 3, wherein the non-oxidizing gas is a gas selected from the group consisting of helium, hydrogen, and mixtures thereof.

References Cited by the Examiner

"Growth and Perfection of Crystals," 1958 edition, edited by Doremus, Roberts and Turnbull, page 74; published by John Wiley & Sons, Inc., New York.

Jacobson's "Encyclopedia of Chemical Reactions," volume 6, 1956 edition, page 91; Reinhold Publ. Corp., New York.

"Semiconductors," by N. B. Hannay, 1959 edition, pages 139 and 140; Reinhold Pub. Corp., New York.

MAURICE A. BRINDISI, *Primary Examiner.*